Sept. 12, 1933.                S. A. STRICKLAND                1,926,123
                        ROLLER BEARING CAGE ASSEMBLY
                            Filed May 25, 1931

INVENTOR
Silas A. Strickland,
BY

ATTORNEYS

Patented Sept. 12, 1933

1,926,123

UNITED STATES PATENT OFFICE 1,926,123

ROLLER BEARING CAGE ASSEMBLY

Silas A. Strickland, Detroit, Mich.

Application May 25, 1931. Serial No. 539,839

4 Claims. (Cl. 308—217)

This invention relates to a roller bearing cage assembly, and its main object is to provide an assembly having maximum resistance to crushing strains. A further object is to provide, within a cage of given diameter, a maximum number of rolls to carry the load, and to provide for limited free independent movement of said rolls circumferentially of inner and outer bearing surfaces with which said rolls are in contact.

It is also an object of the present invention to combine hollow or tubular rolls of a particular construction, with solid rolls, whereby rods for connecting the cage rings, may pass through certain of said rolls without materially lessening the combined resistance of all the rolls to crushing strains and to provide, in a cage assembly having a plurality of rolls confined between cage rings, means for preventing these rolls from getting out of axial parallelism with the axis of the bearing to such an extent as to cause wear or friction in use and to provide means for causing free rotation of the cage rings with the travel of the rolls about the bearing axis.

With the above and other ends in view, the invention consists in the matters hereinafter set forth, and more particularly pointed out in the appended claims, reference being had to the accompanying drawing in which—

Figure 1:
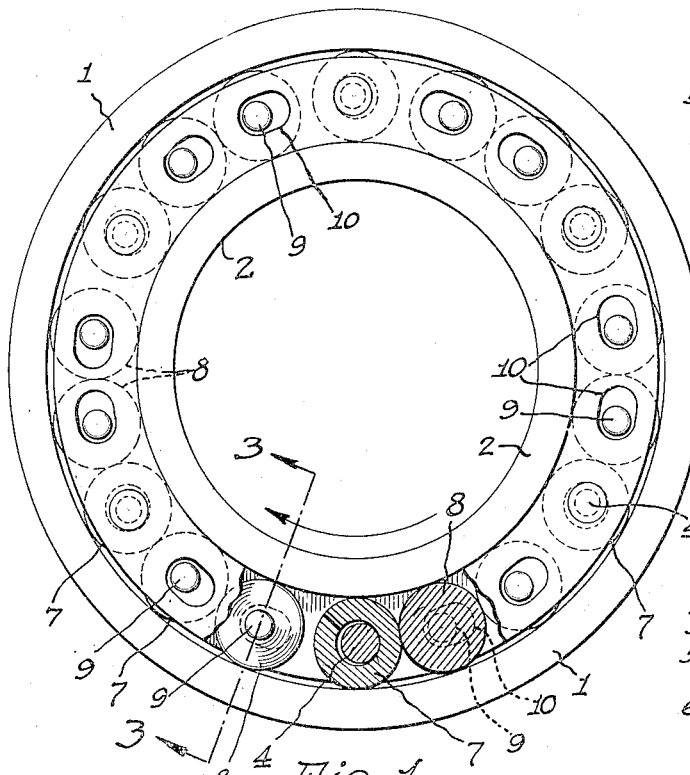
Figure 1 is an end elevation of a bearing cage assembly in operative position between inner and outer members of a bearing, and with portions of said cage and rolls therein, broken away and in section.
Figure 2:
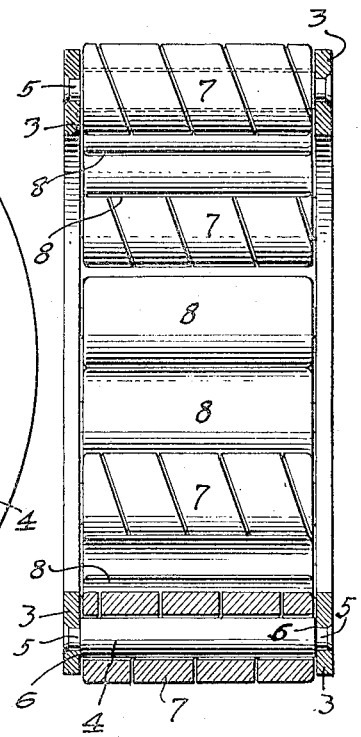
Fig. 2 is a longitudinal section through the cage assembly.
Figure 3:
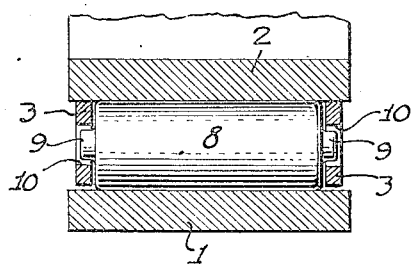
Fig. 3 is a sectional detail substantially upon the line 3—3 of Figure 1.

In the drawing, 1 indicates an outer member and 2 an inner member of any bearing, between which members, the cage assembly embodying the present invention, is inserted to provide an anti-friction or roller support for the inner member within the outer.

As commonly constructed, cage assemblies of this type comprise end rings between which the several bearing rolls are assembled to hold all of these rolls in position for quick insertion in a bearing and to hold these rolls in their relative positions during their travel about the bearing axis in use. To rigidly connect these end rings in which the ends of these rolls are usually mounted for free rotation, rods are usually rigidly secured at their ends to said rings and pass between certain of said rolls, and these rods, therefore, take up space within the given bearing diameter, spacing certain of the rolls apart, and thus lessening the number of rolls which may be used within such given diameter, to carry the load.

In the present construction, the end rings 3 are connected by connecting or stay rods 4 having reduced end portions 5 to pass through openings in said rings, and forming shoulders 6 on these rods to abut the inner sides of the rings, these outer reduced end portions being rigidly secured in the openings in the rings in any suitable manner, as by riveting. Mounted upon each of these rods 4, is a tubular roll 7 having an internal diameter slightly greater than the diameter of the rod to provide a limited lateral movement of these rolls upon the rods and to permit free rotation of the rolls upon the rods. These hollow rolls 7 are preferably of spiral formation as shown, they being each formed by winding a metal strip spirally, with the turns of the spiral spaced apart slightly. These spiral rolls are tempered and ground exteriorly, giving hollow rolls to receive said rods and of maximum load carrying capacity and also having lubricating characteristics, the formation and accurate tempering, giving great strength in sustaining crushing strains as compared with solid tubular rolls to receive these rods, and the spacing between the coils, affording a passage for lubricant to the interior of the roll to lubricate the exterior of the rod upon which the roll is mounted.

The other rolls 8, are, as shown, solid rolls and each is formed with a pintle 9 at each end to engage elongated openings 10 in the cage rings 3 and retain said rolls in place within the assembly, between these rings and permit free movement of these rolls in use, independently of said rings, said openings 10 being of slightly greater width than the diameter of said pintles and being elongated in the direction of ring circumference, to permit limited movement of these rolls 8 relative to said rings, in that direction. A sufficient number of these rolls 8 is provided in the cage between adjacent rolls 7, to take up most of the space between said adjacent rolls, there being, as shown, a pair of rolls 8 between the roll 7 on one rod 4 and a like roll on the next rod, the spacing of these stay rods being such that when the rolls of each pair are in contact with each other and one roll of the pair is in contact with one of the rolls 7, the spaces between adjacent rolls 7 will be nearly filled, thereby making a nearly continuous row of contacting rolls around the cage to support the load to which the inner bearing member 2 is subjected in use.

In order that all of the rolls may have free rolling engagement with the bearing members 1 and 2, independently of the cage rings 3 in either direction of rotation of the bearing, and yet carry these rings around as the rolls travel around the bearing, the pintles 9 of rolls 8 engage loosely within the slots or openings 10 in said rings, these openings 10 being of such a length that, in rolling in one direction, one roll of each pair of rolls 8 will engage one of the adjacent rolls 7 loosely mounted on its stay rod 4 and rotate said rings in that direction, and when said bearing is rotated in an opposite direction, each pair of rolls will be free to shift relative to said rings by reason of said slots 10, and bring the other roll of each pair into engagement with the other adjacent roll 7, thus causing the rings to turn with or be carried around by the opposite travel of the rolls and without appreciable friction. This free shifting of the rolls of each pair of solid rolls 8 into lateral contact with each other and into contact with one of the adjacent rolls 7, brings these rolls into true parallelism with the bearing axis as the roll 7 is held in such relation with the bearing axis by being mounted upon one of the stay rods 4, which rods are rigidly secured at their ends to the cage rings 3.

As all of the rolls 7 which are mounted upon the stay rods 4, are of this spiral formation, with slight spaces between the turns of the spiral, these spaces give free access of lubricant to the stay rods, preventing friction and wear, so that these rolls 7 as well as the rolls 8, while being connected together by the cage assembly comprising the rings 3 and rods 4, take their share of the load without materially increasing friction. The friction is further reduced by providing the pintles 9 upon the ends of the solid rolls 8, which pintles are loosely engaged within the elongated openings 10 in the rings 3 to move freely relative to said rings, said rings simply serving to guide said rolls and to provide an assembled structure. All wear and friction between said pintles 9 and rings 3 is thus eliminated by reason of this loose engagement of said pintles within said openings.

Obviously, any desired number of stay rods 4 may be used according to the diameter of the bearing, and the number of solid rolls 8 carried accordingly to substantially fill the spaces between the several rolls 7 on said rods, thus providing a roller bearing cage in which the rolls are assembled in a manner to provide a substantially continuous row of rolls, with these rolls arranged in groups and with the groups spaced but a very short distance apart. Further, by the combined use of spiral and solid rolls, these spiral rolls provide for the passage of the rods therethrough without materially lessening the combined resistance of all the rolls to crushing loads over that of all solid rolls, and greatly increasing such resistance, over any construction employing all solid rolls with cage rods passing between these rolls, and also over a construction employing solid tubular rolls to accommodate these rods, as such solid tubular rolls are liable to crack under heavy load.

Having thus fully described my invention, what I claim is:—

1. In a roller bearing cage assembly, the combination of a series of tubular and solid rolls arranged in sets, continuous, rigid end rings between which said rolls are mounted, stay rods rigidly connecting said end rings and upon which rods one roll of each set is journaled, the other roll or rolls of each set being mounted upon said rigid rings for free movement thereon in the direction of ring circumference, into and out of side face contact with said roll of each set which is mounted upon said stay rod whereby said freely movable roll or rolls are brought into parallelism with the bearing axis by such contact and held in such parallelism by said rollers on said stay rods.

2. In a roller bearing cage assembly, the combination of continuous, rigid end rings, a plurality of stay rods rigidly connecting said end rings to form a rigid cage, a tubular roller mounted for free rotation upon each of said stay rods, and a plurality of solid rolls mounted at their ends upon said rigid end rings for limited free movement thereon in the direction of ring circumference to contact, laterally, said rolls on said rods, said freely movable rolls substantially filling the spaces between said rolls upon adjacent stay rods.

3. In a roller bearing cage assembly, the combination of two continuous rigid end rings having a plurality of openings elongated on the direction of ring circumference, a plurality of stay rods rigidly connecting said end rings to form therewith a rigid cage, a tubular roller mounted for free rotation upon each of said stay rods, and a plurality of solid rolls substantially filling the spaces between said rolls on said stay rods and having end bearing means engaging said openings in said rings, and free to move therein to permit said rolls to move laterally into side face contact with said rolls on said stay rods.

4. In a roller bearing cage, the combination of a pair of solid continuous end rings having openings elongated in the direction of ring circumference and holes, a plurality of stay rods engaging said holes in said rings and rigidly connecting said rings to form therewith a rigid cage, tubular rolls mounted upon said stay rods and each formed with a spiral slot extending therethrough from end to end thereof, and solid rolls substantially filling the spaces between said spiral rolls on said stay rods and having projecting end pintles to engage and move freely within said elongated openings in said rings and permit said solid rolls to move laterally into side face contact with each other and with said spiral rolls on said stay rods.

SILAS A. STRICKLAND.